July 17, 1951     J. F. HOFFER     2,561,117
FLEXIBLE DRIVE COUPLING
Filed Nov. 6, 1947
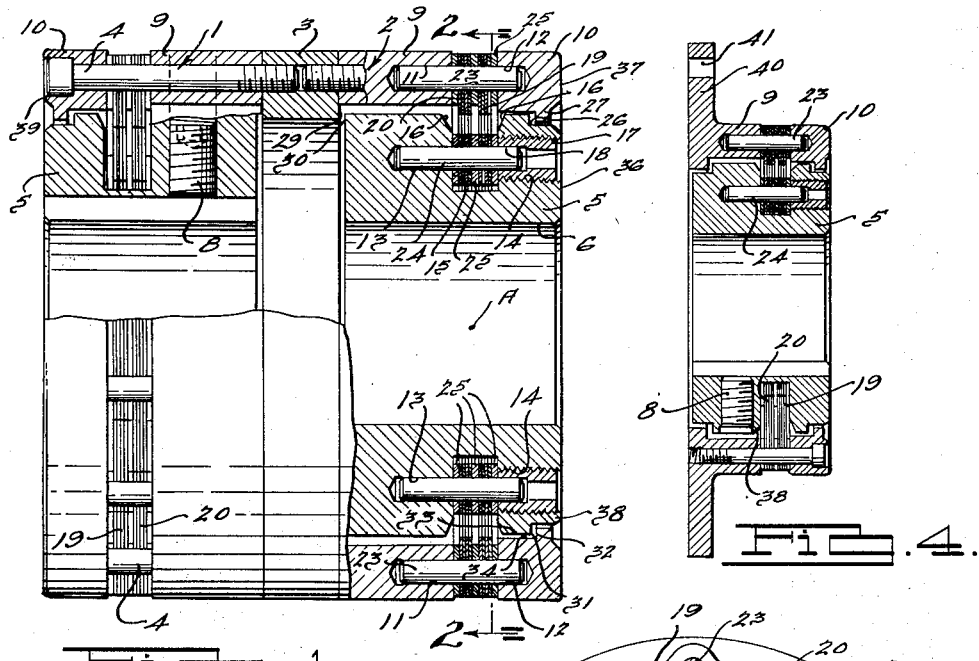
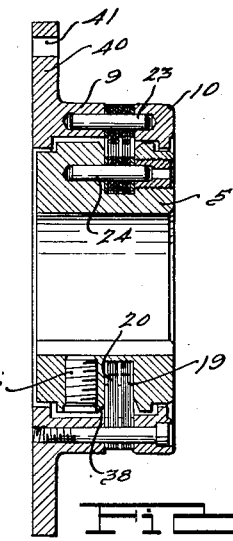
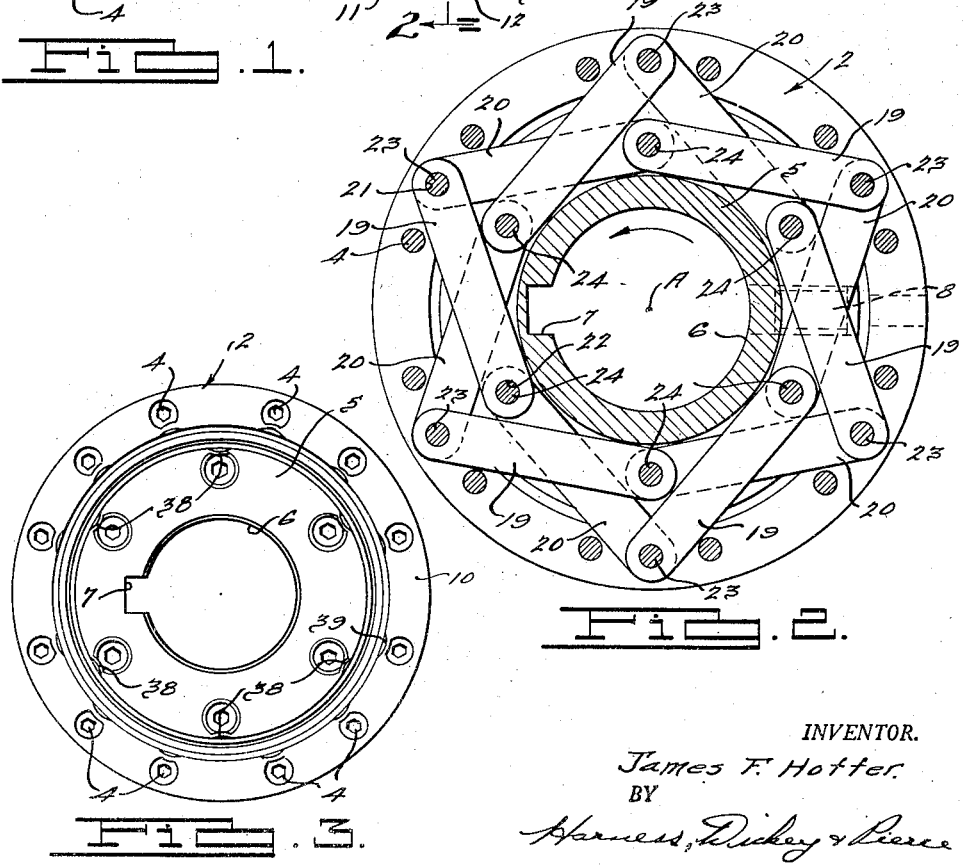
INVENTOR.
James F. Hoffer
BY
Harness, Dickey & Pierce
ATTORNEYS.

Patented July 17, 1951

2,561,117

UNITED STATES PATENT OFFICE 2,561,117

FLEXIBLE DRIVE COUPLING

James F. Hoffer, Detroit, Mich.

Application November 6, 1947, Serial No. 784,355

3 Claims. (Cl. 64—12)

This invention relates to flexible drive couplings for shafts and particularly to flexible couplings by which power is transmitted from the drive shaft to the driven shaft although the shafts are misaligned angularly, axially, in parallel or a combination of these.

The primary object of the present invention is to provide improved flexible couplings of the non-backlash-non-wearing type in which the flexing elements are much less subject to fatigue than in prior couplings.

A further object is to provide flexible couplings which will permit more misalignment of the shafts to be coupled than permitted by prior couplings.

A further object is to provide flexible couplings in which the flexing elements are protected during installation by positive stops which limit parallel, angular and axial misalignment.

A further object is to provide flexible couplings which provide flush, parallel end surfaces for indicating misalignment of the coupled shafts.

A further object is to provide flexible couplings in which the exterior presents a smooth cylindrical form free of any projections or surfaces which might catch clothing, cleaning cloths, and the like.

A further object is to provide flexible couplings in which failure of the flexing elements would not result in damage to the coupled units or danger to personnel.

A further object is to provide flexible couplings in which the deflection and unbalance of each coupling half is limited in a manner that inadvertent rotation of either coupling half while disconnected from the other would not result in damage to the running equipment or danger to personnel.

A further object is to provide flexible couplings in which all threaded parts including set screws can be positively locked.

A further object is to provide flexible couplings in which the drive pins anchoring the flexing elements are supported at both ends to prevent fatigue under shock load conditions.

Another object is to provide flexible couplings which can easily be installed or replaced without moving the coupled machines.

Another object is to provide flexible couplings which will operate safely at higher speeds and loads than prior couplings.

Another object is to provide flexible couplings which are simple and inexpensive to manufacture.

Another object is to provide flexible couplings which when misaligned will transmit rotary motion more uniformly than prior couplings.

Another object is to provide flexible couplings which when used on shafts with torque and rotation always either right hand or left hand, the same coupling parts can be assembled in a manner to greatly increase the normal torque and horsepower rating of the coupling.

Another object is to provide flexible couplings in which the deflection and unbalance of each coupling half is limited in a manner that inadvertent rotation of the fully assembled coupling while installed on one shaft only would not result in damage to the running equipment or danger to the personnel.

Another object is to provide flexible couplings which in addition to functioning as flexible couplings will support heavier radial loads than prior couplings while maintaining exact true centers of the connected shafts, such, for example, as three bearing motor-generator sets.

Other objects of the invention will become apparent from the following specification, the drawing relating thereto and from the claims hereinafter set forth.

In the drawing in which like numbers are used to designate like parts in the several views throughout;

Figure 1 is a vertical cross-sectional view, with parts in elevation, of a flexible coupling embodying features of the present invention;

Fig. 2 is a vertical cross-sectional view taken substantially along the line 2—2 of Fig. 1.

Fig. 3 is an end elevational view of the structure shown in Fig. 1, and

Fig. 4 is a vertical cross-sectional view of a modified form of flexible coupling embodying features of the present invention.

Referring to the drawing, and referring particularly to Figs. 1 to 3 thereof, a flexible coupling according to the present invention is illustrated, which comprises a pair of identical flexible coupling units, generally indicated at 1 and 2, which are spaced apart by a spacer 3. The units 1 and 2 are secured to the spacer 3 and to each other by means of a plurality of spaced screws 4. The screws 4 are received through aligned openings in the units 1 and 2 and are threaded into tapped openings in the spacer 3.

Each of the flexible coupling units 1 and 2 comprises an inner hub member 5, having a central axial opening 6 therethrough and provided with a keyway 7. The drive, or driven, shaft is disposed in the opening 6 in one of the units and the driven, or drive, shaft is disposed in the opening 6 of the other unit and keyed thereto within the keyway 7. A set screw 8 is disposed within a tapped opening in the hub member and engages the key in the keyway to secure the shaft to the hub.

The hub 5, which may be the driving, or driven, member of the coupling, is encircled by driven or driving members 9 and 10 which are generally in the form of rings. The rings 9 and 10 form a unit which is flexibly connected to the hub unit 5 in a manner to be described. Each of the members 9 and 10 has a plurality of aligned or facing openings 11 and 12 therethrough, which are disposed on axes parallel to the axis of the opening 6. In the embodiment illustrated there are six of such aligned openings shown. Corresponding axially aligned openings 13 and 14 are provided in the hub member 5 which communicate with an annular groove 15 formed through the periphery of the hub member 5 and terminate in outwardly flared annular edges 16, the groove 15 corresponding to the space between the members 9 and 10. Clamp screws 17 are received in the tapped openings 14 and have the inner ends provided with axial openings 18 which are aligned with the openings 13.

The members 9 and 10 are interconnected with the hub member 5 by means of two identical sets of spring steel, laminated flexible spokes 19 and 20. The spokes 19 and 20 are provided with openings 21 at their outer ends and openings 22 at their inner ends, which receive pins 23 and 24 respectively therethrough. The ends of pins 23 are received within openings 11 and 12 and the ends of pins 24 are received within openings 13 and 18. Spacing washers 25 are also disposed on pins 23 and 24 between the laminated spokes 19 and 20 and between the outside faces of the spokes at the adjacent surfaces of members 5, 9, 10 and screw 17. The peripheral edges of the washers are rounded.

The inner ends of the spokes 19 and 20 are rigidly clamped to the hub member 5 by means of the six clamp screws 17 and the outer ends of the spokes 19 and 20 are rigidly clamped to members 9 and 10 by means of the twelve screws 4, there being one of each screws closely adjacent to the opposite side of each of the pins 23. The ends of the spokes 19 and 20 are thus firmly secured to the hub member 5 and the rim members 9 and 10 so that all back-lash is eliminated under all driving conditions.

The spacing washers 25 serve to space the spokes from the adjacent surfaces of the members 5, 9, 10 and screw 17 and from each other sufficiently to permit adequate spoke deflection without interference from the adjacent surfaces and sufficiently to prevent contact between the spokes 19 and 20 under conditions of maximum misalignment.

The spokes 19 and 20 each comprise a multiplicity of laminated layers of thin leaves of spring steel or other material of similar characteristics. As mentioned above, they are tightly clamped at both of their ends to prevent movement of the leaves at the areas of attachment, thus eliminating friction and wear under all conditions of operation.

The spokes 19 and 20 are arranged in a criss-cross pattern within a plane of minimum thickness so that rotatively and concentrically the rim members 9 and 10 are rigidly connected to the hub 5. This arrangement permits free relative angular and axial displacement of hub 5 with respect to rim members 9 and 10, within the desired limits. Excessive deflection of the flexible spokes 19 and 20 is prevented by positively limiting angular and axial movement of hub 5 relative to rim members 9 and 10 by limiting the clearance space therebetween. It is pointed out as shown in the drawing that the inner annular surface of the spacer 3 projects radially inwardly beyond the outer peripheral surface of the hub member 5. The outer face of the hub member 5 is provided with an annular reduced portion 26 and the ring member 10 has an inwardly directed annular flange 27 formed thereon, adjacent the surface of the reduced portion 26. The outer annular surface of the hub 5 is also spaced from the inner annular surfaces of the ring members 9 and 10, the inner annular surface of ring member 10 being closer to its adjacent surface of hub member 5 than the corresponding inner annular surface of ring member 9.

Angular movement of the hub member 5 with respect to member 9 and member 10 centers approximately at point A, the theoretical center of the plane of spokes 19 and 20. It can be readily seen that maximum relative angular displacement of the hub 5 about point A will cause approximately simultaneous abutment of surfaces 29 and 30 at some point and surfaces 31 and 32 at a diametrically opposite point. A relatively small clearance is provided between cylindrical surfaces 33 and 34 respectively, so that in case of some accident causing spoke failure, the rim assembly comprising all of the outer parts securely bolted together, will rotate about hub 5 with surfaces 33 and 34 serving as emergency bearing surfaces. The rim assembly will thus remain in sufficiently close radial alignment to prevent damage in such an emergency to the coupled machines and danger to personnel during the period required to stop the machines.

The spacer 3 may be increased in length from that shown up to, for example, many feet. For all applications in which the spacer 3 is as long or longer than the coupling units 1 and 2, the coupling can be installed or removed without moving either of the coupled machines. This is accomplished by first removing all of the screws 4 from the spacer 3 which will permit the radial removal of the spacer and one of the adjacent coupled units may be moved axially into the position normally occupied by spacer 3 where it can be removed radially.

Referring to Fig. 2, if the hub 5 is driven in the direction indicated by the arrow, all spokes 19 in both coupling units 1 and 2 will work in direct tension while all spokes 20 will work in direct compression. Since the spokes working in tension will pull many times the maximum load which could be pushed by the spokes in compression, due to the tendency of long beams of relatively small cross section to buckle in compression, the spokes in tension would bear an increasing proportion of the drive load if the latter increased up to the ultimate torque capacity of the coupling. Since, however, the service rating of the coupling is only a small portion of the ultimate torque capacity, it follows that the spokes in compression, while supporting substantially less than fifty percent (50%) of the service rated drive load, will support an appreciable percentage of the latter load. Thus in the coupling of the present invention, the torque load on each of the coupling units 1 and 2 is distributed over six flexible coupling elements in tension and six in compression in the embodiment illustrated.

If the direction of drive is reversed, all spokes 20 will work in tension and all spokes 19 will work in compression.

The number of leaves making up the laminated spoke units 19 and 20 may be varied and is a matter of design. For coupling installations in which the torque and rotation is always either right-hand or left-hand, it is obvious that each spoke unit 19 may be stacked with the leaves of spoke unit 20, or vice versa, thus materially increasing the load-carrying capacity of the coupling by working all spokes in tension.

It should be noted that the leaves of spoke units 19 and 20 can readily be stamped from spring steel strip stock in which the grain or fiber induced in the steel by the steel rolling process, is always longitudinal of the strip and will, therefore, be longitudinal in each spoke leaf. Since the direction of drive load on the spoke leaves is always exerted longitudinally in each leaf while leaf deflection induced by misalignment of the coupled shafts is always transverse in the leaf, the fatigue resistance of leaves under conditions of misalignment, in view of the longitudinal grain or fiber in the leaf is over twice as high, according to Izod impact fatigue tests, as would be the case if the grain or fiber were transverse in the leaf.

When the coupling is mounted on coupled shafts which are in good alignment, the outer face or surface 36 of the hub 5 and the outer face or surface 37 of ring 10 will be flush and parallel in order that poor or excessive misalignment can be readily observed. Thus, time-consuming indicator setups can be eliminated by simply laying any straight edge across surfaces 36 and 37.

Various safety features of the coupling in the present invention should be noted. There are no projecting surfaces to catch clothing or objects upon contact. All screws are positively locked by peening over the adjacent surface as indicated at 38 and 39. This peening is accomplished through the thin lips provided adjacent the screw openings.

In case a coupling is assembled on one shaft only and the shaft started inadvertently under power, the abutment or stop surfaces 29, 30, 31 and 32 will prevent excessive unbalance of the unsupported coupling members, thus preventing damage to the driving machine and danger to the personnel. It should also be pointed out that all pins 23 and 24, which anchor the ends of the laminated spoke units 19 and 20, are supported at both ends in order to provide maximum strength and rigidity for overload and shock drive conditions. Since there are no overhanging pins or screws which are subject to excessive centrifugal forces, the coupling can be operated at higher speeds for given sizes as compared to prior couplings.

Referring to Fig. 4, a modified form is illustrated in which a single coupling unit is shown. The coupling unit is identical to coupling units 1 and 2 except that the rim member 9 is provided with an annular flange 40. This form of coupling is adapted to not only flexibly couple two rotating shafts but to support the one end of one of the shafts transferring the load to the other shaft. This single coupling unit compensates for angular or axial misalignment only. Parallel misalignment should not be encountered in this type of installation. The openings 41 in the flange 40 at spaced intervals serve to bolt and connect the mating flange on one of the coupled shafts.

Formal changes may be made in the specific embodiments of the invention described without departing from the spirit and substance of the invention the scope of which is commensurate with the appended claims.

What is claimed is:

1. A flexible coupling comprising a hub member, a pair of ring members disposed in encircling and spaced relationship with respect to said hub member, a plurality of angularly disposed flexible leaf elements interconnecting said members and uniformly spaced therearound, the outer ends of said elements being disposed between said ring members and rigidly connected thereto, and means rigidly connecting the inner ends of said elements to said hub member.

2. A flexible coupling comprising a pair of coupling units, each unit including a hub member, a pair of ring members disposed in encircling and spaced relationship with respect to said hub member, a plurality of angularly disposed flexible leaf elements interconnecting said members and uniformly spaced therearound, the outer ends of said elements being disposed between said ring members and rigidly connected thereto, and means rigidly connecting the inner ends of said elements to said hub member, an annular spacer member disposed between the facing surfaces of said units, and means securing said units and spacer member together.

3. A flexible coupling comprising a hub member having an annular groove in the periphery thereof, a pair of ring members disposed in encircling and spaced relationship with respect to said hub member, a plurality of angularly disposed flexible leaf elements having openings in the ends thereof interconnecting said members and uniformly spaced therearound, pins mounted within facing openings in said ring members and being disposed through the openings in the outer ends of said elements, the outer ends of said elements being disposed between said ring members and rigidly connected thereto on said pins, other pins disposed in facing openings in said hub groove and being disposed through the openings in the inner ends of said elements, and means rigidly connecting the inner ends of said elements to said hub member on said other pins.

JAMES F. HOFFER.

REFERENCES CITED

The following references are of record in the file of this patent:

UNITED STATES PATENTS

| Number | Name | Date |
| --- | --- | --- |
| 1,654,312 | Trumpler | Dec. 27, 1927 |
| 1,893,593 | Oechsle | Jan. 10, 1933 |
| 2,181,888 | Gustin | Dec. 5, 1939 |
| 2,431,409 | Mart | Nov. 25, 1947 |
| 2,435,058 | Thomas | Jan. 27, 1948 |

FOREIGN PATENTS

| Number | Country | Date |
| --- | --- | --- |
| 366,938 | Germany | Jan. 13, 1923 |
| 535,697 | Germany | Oct. 14, 1931 |